C. C. Lloyd,
Fan Blower.

N° 6,341.  Patented Apr. 17, 1849.

UNITED STATES PATENT OFFICE.

CHAS. C. LLOYD, OF PHILADELPHIA, PENNSYLVANIA.

BLAST-GENERATOR.

Specification of Letters Patent No. 6,341, dated April 17, 1849.

*To all whom it may concern:*

Be it known that I, CHARLES C. LLOYD, of Philadelphia, in the county of Philadelphia and State of Pennsylvania, have invented a new and useful Improvement on Rotary Blast-Generators; and I do hereby declare that the following is a full, clear, and exact description of the construction and operation of the same, reference being had to the annexed drawings, making a part of this specification, in which—

Figure 6:
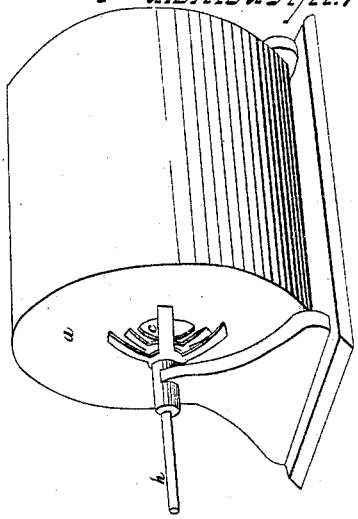
Figure 2:
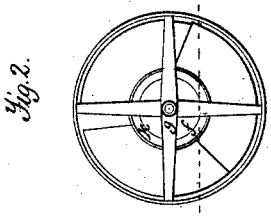
Figure 1:
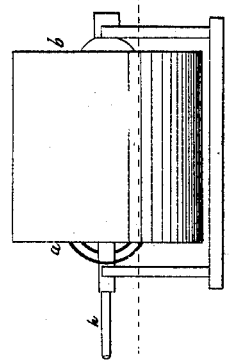
Figure 4:
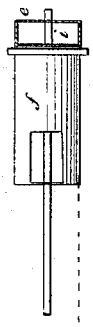
Figure 5:
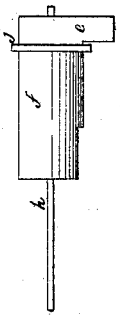
Figure 3:
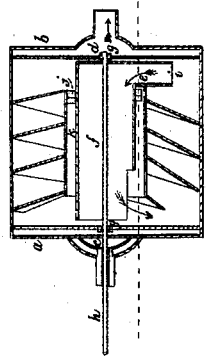

Figure 1 is a longitudinal elevation, Fig. 2 an end view with drum-head $a$ detached, Fig. 3 a sectional view, Figs. 4 and 5 the conduct pipe with elbow in different positions, Fig. 6 a perspective view.

The nature of my improvement consists in providing drum-heads at the extremes of the machine, for the purpose of confining the water or other fluid within the same—thus superseding the necessity of a separate reservoir to contain the fluid,—and in so arranging a valve or slip-joint at the end of the inner cylinder, which, while it prevents the compressed air from returning through the same, freely admits the water or other fluid to circulate from one extreme of the machine to the other.

I will now proceed to describe its construction and operation.

I construct my helical passages in any of the known forms; but in order to confine the fluid within the machine, I affix thereto the drum-heads $a$, $b$, by any appropriate mechanical arrangement. These drum-heads have each an aperture $c$ $d$; $c$ is designed for the ingress of the air, $d$ for egression of of the same when compressed. The elbow $e$ connected with the conduct-pipe $f$, with which it has a free communication, is supported by journals on the bearings $g$ $g$, and made stationary by the shaft $h$ being firmly fastened to the frame work upon which the machine rests;—its bottom $i$ being open and always below the mark of the fluid, preserves a free communication between the extremes of the machine, thereby enabling the fluid to seek an equilibrium at all times. In connection with the conduct-pipe $f$ or the elbow $e$, or both together, is affixed one part of the valve or slip-joint $j$ while the other part is attached to the inner cylinder $k$. This joint being air tight, prevents the compressed air from returning through the inner cylinder; it may be made of any metallic substance ground air tight, or packed and rendered air tight by the application of leather or other material. The aperture $d$ in drum-head $b$ may be omitted,—in which case a tube is necessary by which the compressed air may be conducted through the top of the elbow $e$—thence through the center of the machine and out at the aperture $c$, which pipe being firmly fastened to the frame upon which the machine rests, may subserve the purpose of the shaft $h$.

The operation of my improved rotary blast generator is as follows: Motion being imparted to the machine, the water or other fluid discharged through the helical passages, will, being acted upon by the law of gravity and the direct action of the compressed air, readily return from whence it came, by means of the conduct-pipe $f$, while the compressed air will be discharged through the aperture $d$, or in case of that aperture being omitted, through a tube emerging from the aperture $c$.

Having thus fully described my improved rotary blast generator, what I claim as my invention and desire to secure by Letters Patent, is—

The combination and arrangement of the drum-heads $a$ $b$, the valve or slip-joint $j$, and the conduct-pipe $f$ with the elbow $e$, substantially in the manner and for the purpose herein set forth.

CHAS. C. LLOYD.

Witnesses present:
JOHN A. WHITE,
THOS. G. RUTHERFORD.